S. R. M. ORUM.
FOOT CONTROL MECHANISM FOR MOTOR VEHICLES.
APPLICATION FILED AUG. 30, 1913.
1,114,024.
Patented Oct. 20, 1914.
2 SHEETS—SHEET 1.
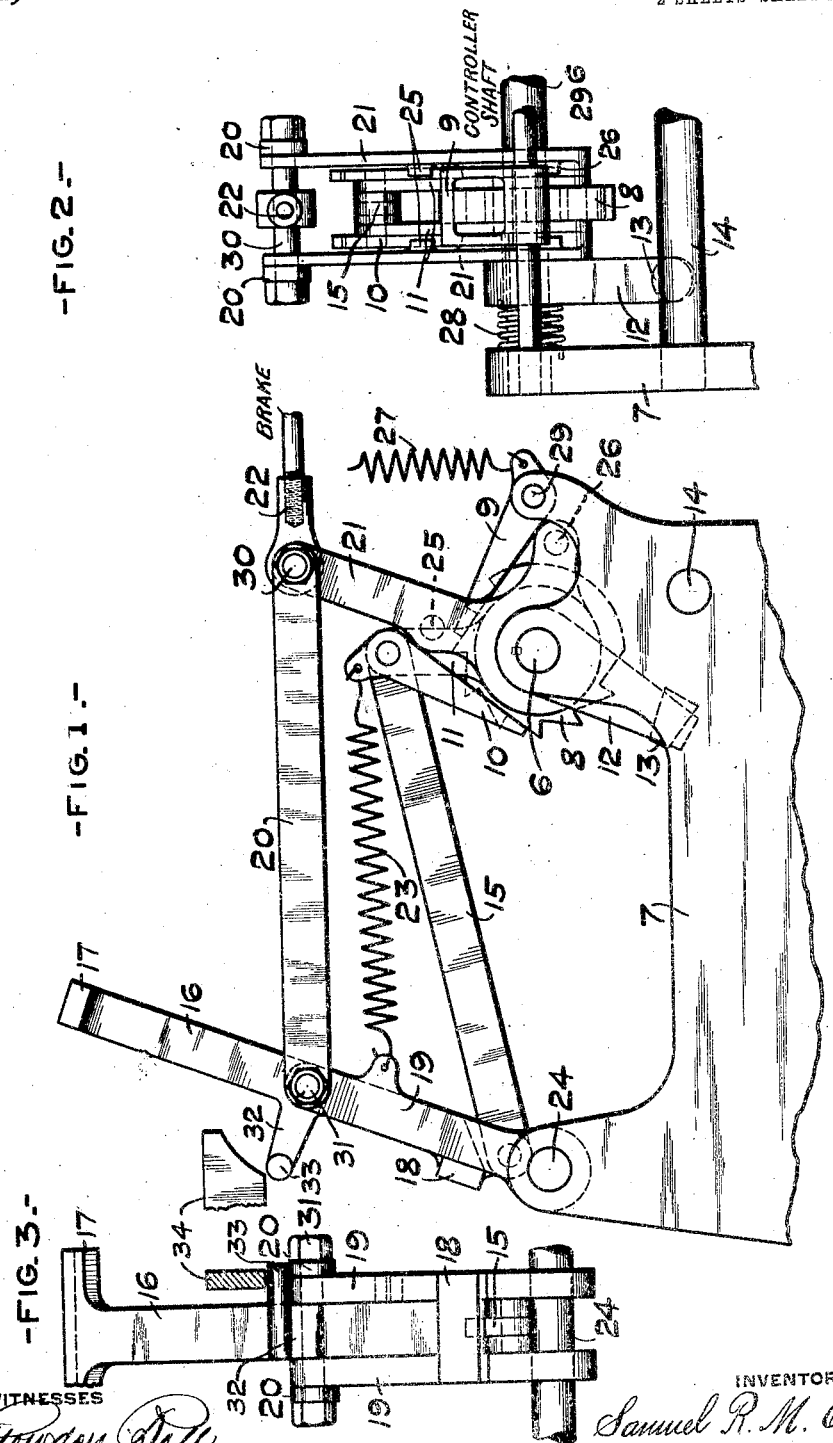
INVENTOR
Samuel R. M. Orum
by Edward Wright
Atty
WITNESSES S. R. M. ORUM.
FOOT CONTROL MECHANISM FOR MOTOR VEHICLES.
APPLICATION FILED AUG. 30, 1913.
1,114,024.
Patented Oct. 20, 1914.
2 SHEETS—SHEET 2.
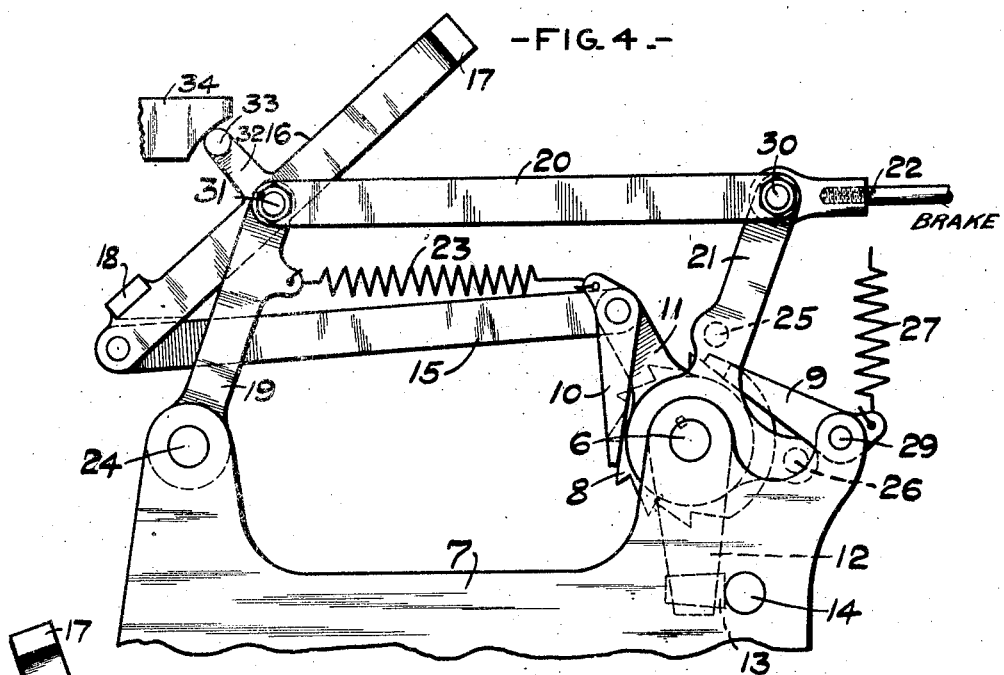
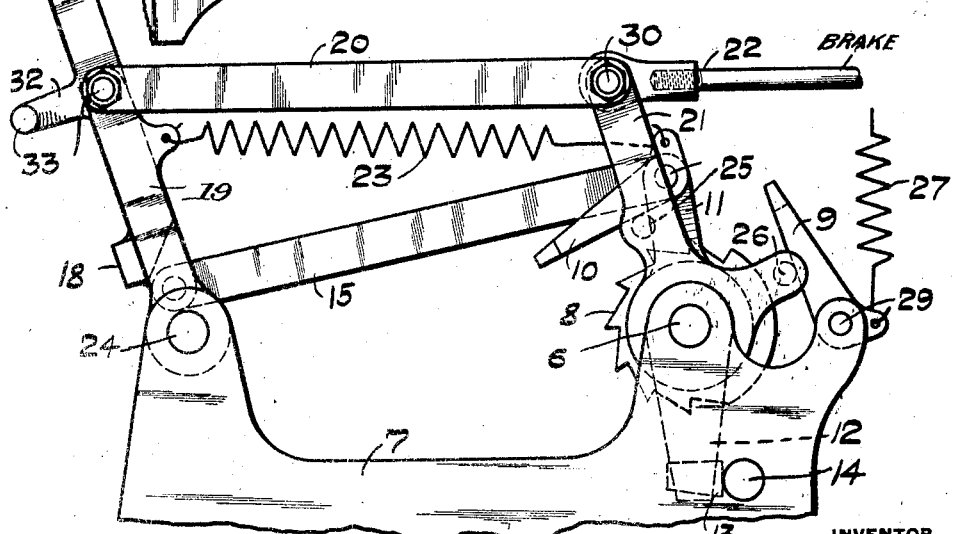
WITNESSES
INVENTOR
Samuel R. M. Orum.
by Edward Wright
Atty.

UNITED STATES PATENT OFFICE.

SAMUEL R. M. ORUM, OF DETROIT, MICHIGAN.

FOOT CONTROL MECHANISM FOR MOTOR-VEHICLES.

1,114,024. Specification of Letters Patent. Patented Oct. 20, 1914.

Application filed August 30, 1913. Serial No. 787,427.

*To all whom it may concern:*

Be it known that I, SAMUEL R. M. ORUM, a citizen of the United States, residing at Detroit, in the county of Wayne and State of Michigan, have invented a certain new and useful Improvement in Foot Control Mechanism for Motor-Vehicles, of which improvement the following is a specification.

This invention relates to mechanism for controlling the power and braking of automobiles or motor vehicles, and is particularly adapted for auto-trucks and pleasure vehicles driven by electric motors, the principal object being to provide an improved mechanism adapted to be operated by the foot of the driver for actuating the power controller and also the brake of the vehicle, whereby both hands of the driver or operator may be free to manipulate the steering gear.

The improvement claimed is hereinafter fully set forth.

In the accompanying drawings: Figure 1 is a side elevation of a foot lever mechanism embodying my improvement, and showing the parts in the position in which the controller has been set forward one notch; Fig. 2, a rear end view showing the controller shaft and its connections; Fig. 3, a front end view showing the foot lever; Fig. 4, a side elevation similar to Fig. 1, but showing the parts in the normal off position; and Fig. 5, a similar view showing the parts in the stopping or braking position.

According to my improvement, the supply of current or motive fluid to the propelling motor or motors of the vehicle is regulated by what may be termed a power controller having an "off" or neutral position and a plurality of speed positions, as determined by certain notches, to which it may be advanced in a step-by-step motion by successive short traverses, or oscillations of a pedal or foot lever device, which is also provided with means operated by a longer traverse of the pedal to throw off the controller and apply the brake.

As shown in the drawings, the power controller shaft, 6, is mounted to rotate in bearings in the frame, 7, and may operate the usual form of electric contacts or other well known devices for regulating the supply of motive fluid to the motors. On the controller shaft is keyed a ratchet wheel, 8, having the desired number of notches for engaging the pawls, the fixed pawl, 9, being pivoted on the rod, 29, fixed to the frame, and the movable pawl, 10, being pivoted on the pawl carrier, 11, rotatably mounted on the controller shaft. An arm, 12, is also keyed to the controller shaft, and is provided with a rubber cushion, 13, for engaging a rod, 14, fixed in the frame to serve as a stop for the controller in its normal "off" or neutral position. Means, such as a spring, 28, is provided for throwing the controller to its "off" position whenever the pawls are released. A releasing arm, 21, having projections, 25 and 26, for engaging the respective pawls, 10 and 9, is also rotatably mounted on the controller shaft.

For the purpose of operating the controller step-by-step, or from one notch to the next, in turning on the power, and also for throwing off the power whenever desired, I provide a compound foot lever device comprising a member, 19, which may be formed double or bifurcated, and pivoted upon a fulcrum pin, 24, in the frame, and upon which is pivotally mounted the primary foot lever or member, 16, having a pedal, 17, at its upper end and turning upon a pin, 31, as its fulcrum. The lower end of the lever, 16, is connected by means of the rod or bar, 15, with the movable pawl carrier, 11, while the lever member, 19, is coupled with the releasing arm, 21, by means of the connecting bar or bars, 20.

The primary lever member, 16, may be operated upon its fulcrum, 31, through a succession of short traverses, or oscillations to and fro, without moving the lever member, 19, but upon a longer movement of the pedal, the flanges or lugs, 18, of lever, 16, engage the member, 19, and both members then turn as one lever about the fulcrum, 24. The member, 19, is connected by a tension spring, 23, with the pawl, 10, and pawl carrier, 11, and a spring, 27, is attached to the pawl, 9. A brake rod, 22, may be pivotally connected to the pin, 30, to be actuated to apply the brakes of the vehicle by the movement of the bar, 20, and the lever, 19, after the pawls are released.

With the apparatus and the controller in the normal off position, as indicated in Fig. 1, when it is desired to start the vehicle, the driver or operator places his foot upon the pedal, 17, and by means of his heel pushes the pedal forward, turning the lever member upon its fulcrum, 31, through its short traverse until the flange, 18, comes in contact with the member, 19, which is the position shown in Fig. 1. During this movement the bar, 15, turns the pawl carrier, 11, pawl, 10, and ratchet wheel, 8, with the controller forward one step or notch, in which position the fixed pawl, 9, drops into the next notch of the ratchet wheel, and holds the controller in its first speed position, as shown in Fig. 1. The spring, 23, is stretched during this movement, and when the operator moves his foot and the pedal backward to its first normal position, this spring, 23, acts to return the pawl carrier and pawl, whereupon the pawl drops into the next notch upon the ratchet wheel. By another short traverse of the pedal, the controller is advanced another notch to the next speed position, and in the same manner, the controller is operated step-by-step through its successive speed positions until it reaches the fourth or full speed position. It will be evident that any number of positions may be provided as desired.

When it is desired to throw off the power, and stop the vehicle, the driver makes a longer traverse of the pedal, whereby the lever, 19, is actuated to move the releasing arm, 21, so that the projections, 25 and 26, throw out the pawls, 10 and 9, from engagement with the ratchet wheel, whereupon the spring, 28, returns the controller to "off" position, as shown in Fig. 5 of the drawing. The controller is released and thrown off as soon as the foot lever is moved a short distance beyond its position shown in Fig. 1, and the brake is applied by the further forward push of the pedal to its extreme forward position, indicated in Fig. 5. The spring, 23, also serves to return the lever mechanism to its normal position and holds the pawl, 10, in engagement with the teeth or notches of the ratchet wheel.

The usual brake release spring (not shown) will ordinarily be sufficiently strong to hold the lever, 19, against any forward movement during the preliminary forward movements of the lever, 16, in advancing the controller step-by-step, and thus prevent a premature or accidental release of the pawls during such movements. If preferred, however, any such movement of lever, 19, may be positively prevented by the use of a locking means, such as an arm, 32, having a projection, 33, on lever, 16, and adapted to coöperate with the curved stop plate, 34, to permit the free preliminary movement of lever, 16, but prevent the forward movement of lever, 19, until lever, 16, reaches the position indicated in Fig. 1, in which the projection, 33, clears the stop plate, 34, and permits the further traverse of the foot lever mechanism.

It will now be seen that I have provided a simple and efficient mechanism operated by the foot of the driver, through a series of short traverses, for advancing the power controller step-by-step to any speed position desired, and by a further or longer traverse, to quickly throw off the power and apply the brakes with any desired degree of force, thus giving the driver perfect control of the vehicle, and at the same time leaving both hands free to manipulate the steering gear.

Having now described my invention, what I claim as new and desire to secure by Letters Patent is:

1. In a control mechanism for motor vehicles, the combination of a power controller device having a series of positions, a foot lever device having connections for advancing the controller step-by-step to its different positions by successive short traverses of the foot lever, and means operated by a longer traverse of said foot device for returning the controller to its off position.

2. In a control mechanism for motor vehicles, the combination of a power controller device having a series of positions, a foot lever device having connections for advancing the controller step-by-step to its different positions by successive short traverses of the foot lever, a brake device, and means operated by a longer traverse of said foot lever for turning off the controller and applying the brake.

3. In a control mechanism for motor vehicles, the combination of a power controller device, a compound foot lever device having two members, means connected to one member for advancing the controller step-by-step, and means operated by the other lever member for throwing off the controller.

4. In a control mechanism for motor vehicles, the combination of a power controller device, a compound foot lever device having two members, means connected to one member for advancing the controller step-by-step, a brake device, and means operated by the other lever member for throwing off the controller and applying the brake.

5. In a control mechanism for motor vehicles, the combination of a power controller device, a foot lever device comprising a member having a fixed fulcrum, another lever member pivoted upon the first and movable independently thereof during short traverses and coincidentally therewith upon a longer traverse, means connected to the second lever member for advancing the controller step-by-step, and means operated by the first lever member for throwing off the controller.

6. In a control mechanism for motor vehicles, the combination of a power controller device, a pawl and ratchet device for advancing the controller step-by-step, a pedal device having a short traverse for actuating the ratchet, and means operated by a longer traverse of the pedal for releasing the pawl.

7. In a control mechanism for motor vehicles, the combination of a power controller device, a ratchet wheel mounted on the controller shaft, a pawl carrier and pawl for advancing the controller step-by-step, means normally tending to move the controller to its off position, a fixed pawl for holding the controller, a pedal device having a connection for actuating the pawl carrier during short traverses, and means operated by a longer traverse of the pedal for releasing the pawls.

8. In a control mechanism for motor vehicles, the combination of a power controller device, a pawl and ratchet device for advancing the controller step-by-step, a pedal device having a short traverse for actuating the ratchet, a brake device, and means operated by a longer traverse of the pedal for releasing the pawl and applying the brake.

SAMUEL R. M. ORUM.

Witnesses:
   JOSEPHINE M. ORUM,
   AGNES M. KARRER.